(12) United States Patent
Erickson et al.

(10) Patent No.: US 7,181,580 B2
(45) Date of Patent: Feb. 20, 2007

(54) SECURE POINTERS

(75) Inventors: Kevin J. Erickson, Rochester, MN (US); Richard K. Kirkman, Rochester, MN (US); Patrick J. McCarthy, Rochester, MN (US); Scott A. Plaetzer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 10/401,252

(22) Filed: Mar. 27, 2003

(65) Prior Publication Data

US 2004/0193814 A1 Sep. 30, 2004

(51) Int. Cl.
*G06F 12/00* (2006.01)
*G06F 13/00* (2006.01)

(52) U.S. Cl. .................. 711/156; 711/203; 711/206

(58) Field of Classification Search ............. 711/202, 711/203, 206, 207, 100, 154, 156, 200
See application file for complete search history.

(56) References Cited

U.S. PATENT DOCUMENTS

| | | | | |
|---|---|---|---|---|
| 4,868,745 A | * | 9/1989 | Patton et al. ............... 711/202 |
| 5,459,798 A | * | 10/1995 | Bailey et al. ............... 382/218 |
| 5,835,963 A | * | 11/1998 | Yoshioka et al. ........... 711/207 |
| 5,881,379 A | * | 3/1999 | Beier et al. ................ 707/101 |
| 6,085,296 A | * | 7/2000 | Karkhanis et al. .......... 711/147 |

\* cited by examiner

*Primary Examiner*—Tuan V. Thai
(74) *Attorney, Agent, or Firm*—Owen J. Gamon

(57) ABSTRACT

A method, apparatus, system, and signal-bearing medium that in an embodiment map a pointer to a target indirectly via a pointer map. In an embodiment, the pointer map is stored in a reserved area and an entry for the pointer in the pointer map includes a back-pointer containing an address of the pointer and a target-address containing the address of the target. When the pointer is accessed, the pointer is checked to ensure its contents point at the entry in the pointer map in the reserved area and that the back-pointer in the pointer map entry points back at the pointer. In this way, pointers are protected from being modified illegitimately.

20 Claims, 6 Drawing Sheets

SECURE POINTERS

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to computers and more particularly to the security of pointers in computers.

BACKGROUND

Computers are increasingly becoming interconnected because users desire to access information stored at remote locations. This interconnection gives unauthorized persons the opportunity to access computers that are thousands of miles away. This unauthorized access may take the form of potentially destructive code, often called computer viruses, worms, or Trojan horses. One way that this destructive code can attack a computer is by altering pointers within the computer, which the destructive code may then use to access or alter the contents of critical system data or resources.

A pointer is a storage location in computer memory that contains the address of, or points to, another storage location. The concept of pointers may be understood by referring to FIG. 1, which illustrates a block diagram of typical pointers in memory 100. Pointer 101 is at storage location having an address of &A within computer memory and contains &B, which is the address of another storage location, which contains a target 110. Thus, the pointer 101 contains the address of the target 110, so the pointer 101 is said to point at the target 110.

A legitimate copy of a pointer appears identical to the original pointer, except that the legitimate copy is located at a different address. Thus, the pointer 102 at address &C, which also contains &B, also points at the target 110 and represents a legitimate copy of the pointer 101.

But, the pointer 103 is an illegitimate copy of pointer 101 in that the original contents of the pointer 101 (&B) have been replaced with a new contents (&E), so that the pointer 103 now points at the duped target 115 at address &E. Although the duped target 115 may have a legitimate address for the executing code thread to access, using an illegitimate pointer to access or alter the contents at that address as if it were the target 110 at address &B may cause data corruption or integrity problems.

What is needed is a way to enhance system security to protect the computer from accessing and/or altering incorrect storage locations. Although the aforementioned problems have been described in terms of unauthorized persons attempting to defeat system security measures, the problem of incorrect storage locations may have any cause whether intentional or inadvertent. Further, destructive code may be loaded onto the computer via any mechanism not limited to interconnected computers.

SUMMARY

A method, apparatus, system, and signal-bearing medium are provided that in an embodiment map a pointer to a target indirectly via a pointer map. In an embodiment, the pointer map is stored in a reserved area and an entry for the pointer in the pointer map includes a back-pointer containing an address of the pointer and a target-address containing the address of the target. When the pointer is accessed, the pointer is checked to ensure its contents point at the entry in the pointer map in the reserved area and that the back-pointer in the pointer map entry points back at the pointer. In this way, pointers are protected from being modified illegitimately.

DETAILED DESCRIPTION

Figure 2:
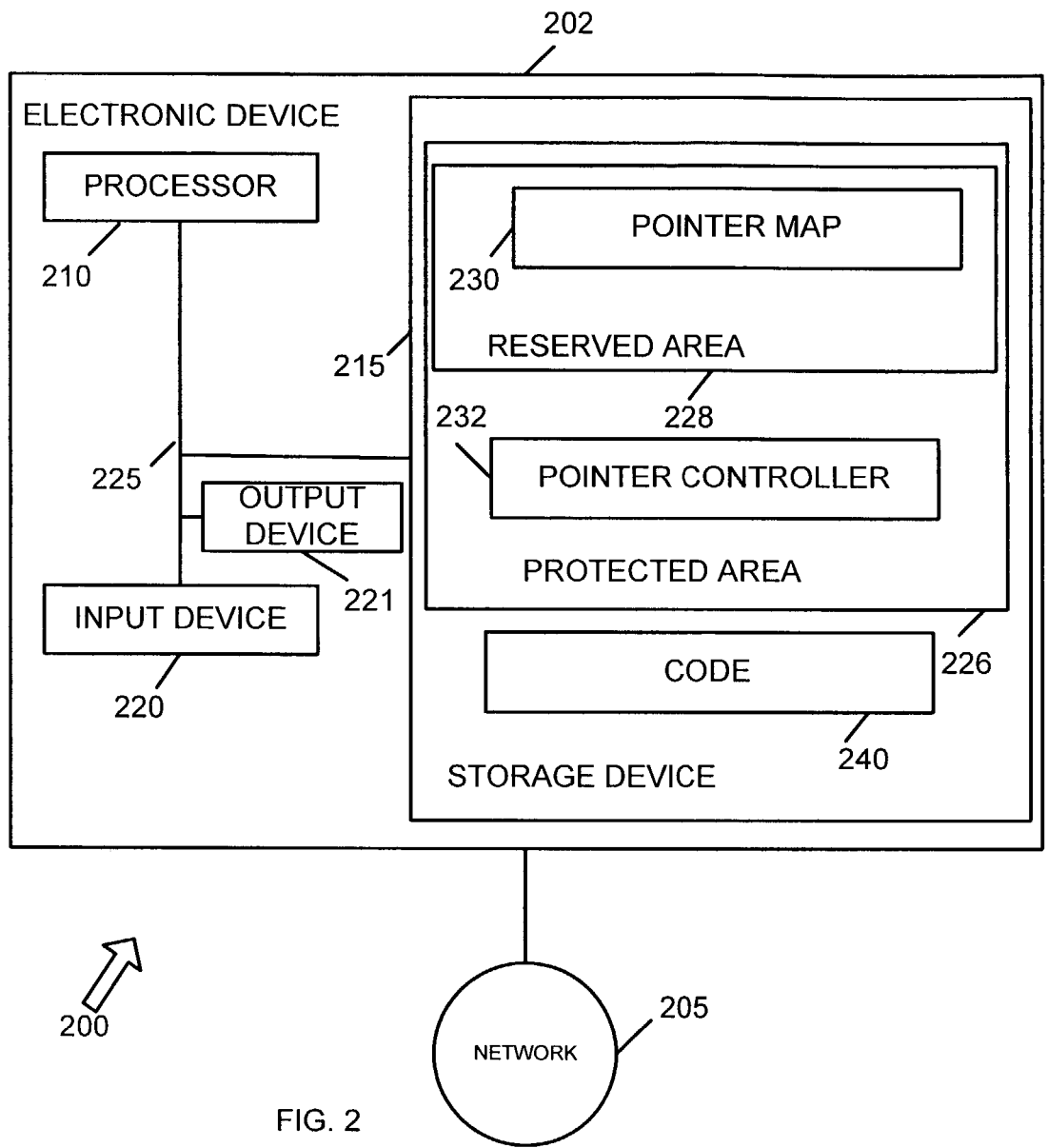
FIG. 2 depicts a block diagram of an example system for implementing an embodiment of the invention.

FIG. 2 depicts a block diagram of an example system 200 for implementing an embodiment of the invention. The system 200 includes an electronic device 202 connected to a network 205. Although only one electronic device 202 and one network 205 are shown, in other embodiments any number or combination of them may be present. In another embodiment, the network 205 is not present.

The electronic device 202 includes a processor 210, a storage device 215, an input device 220, and an output device 221, all connected directly or indirectly via a bus 225. The processor 210 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 210 executes instructions and includes that portion of the electronic device 202 that controls the operation of the entire electronic device. Although not depicted in FIG. 2, the processor 210 typically includes a control unit that organizes data and program storage in memory and transfers data and other information between the various parts of the electronic device 202. The processor 210 reads and/or stores code and data to/from the storage device 215, the network 205, and/or the input device 220.

Although the electronic device 202 is shown to contain only a single processor 210 and a single bus 225, the present invention applies equally to electronic devices that may have multiple processors and multiple buses with some or all performing different functions in different ways.

The storage device 215 represents one or more mechanisms for storing data. For example, the storage device 215 may include read only memory (ROM), random access memory (RAM), magnetic disk storage media, optical storage media, flash memory devices, and/or other machine-readable media. In other embodiments, any appropriate type of storage device may be used. Although only one storage device 215 is shown, multiple storage devices and multiple types of storage devices may be present. Further, although the electronic device 202 is drawn to contain the storage device 215, it may be distributed across other electronic devices, such as devices connected to the network 205.

The storage device 215 includes a protected area 226 and code 240. The protected area is protected by the processor 210, such that the protected area can only be accessed (read or written to) by instructions executing on the processor 210 when the processor 210 is in privileged mode.

Privileged mode is a processing mode designed for operating system components and hardware-manipulating drivers. In an embodiment, privileged mode allows direct access to hardware and all memory. An alternative to privileged mode is user mode, which is a restricted processing mode designed for applications, environment subsystems, and integral subsystems. Privileged mode is also called master mode or supervisory mode. The instructions that execute in privileged mode are often called the kernel. The purpose of separating the privileged and unprivileged (user) modes is to prevent untrusted components from executing instructions or accessing memory that would compromise system security. For example, in an embodiment an attempted execution of such an instruction in the unprivileged mode alerts the operating system, which may result in the offending program's termination.

The protected area 226 includes a pointer controller 232 and a reserved area 228. The reserved area 228 includes a pointer map data structure 230. In another embodiment, the reserved area 228 may also include other objects. The pointer controller 232 is system code within the protected area 226 that controls the creation and access of pointers using the pointer map 230. In an embodiment, the pointer controller 232 includes instructions capable of executing on the processor 210 to carry out the functions as further described below with reference to FIGS. 3–6. In another embodiment, the pointer controller 232 may be implemented in hardware via logic gates and/or other appropriate hardware techniques.

The reserved area 228 is an address range in the storage device 215 that the pointer controller 232 sets aside for the pointer map 230. In an embodiment, the pointer controller 232 ensures that pointers point to valid addresses within the pointer map data structure 230 within the reserved area 228, as further described below with reference to FIG. 6.

The pointer map 230 is a data structure used in an embodiment of the invention to prevent any code other than privileged system code in the protected area 226 from constructing a valid pointer. The pointer map 230 features a double dereferencing mechanism that offers protection from duping attacks. Although only one pointer map data structure 230 is shown, in another embodiment multiple data structures may exist, e.g., one pointer map for each process. The pointer map data structure 230 is further described below with reference to FIG. 3.

The code 240 includes executable or interpretable instructions that desire to create or access a pointer. The code 240 may be part of the operating system of the electronic device 202, may be an application, or may be any other type of code. The code 240 may have been loaded into the storage device 215 from the input device 220, from the network 205, or from any other appropriate origin.

The input device 220 may be a keyboard, mouse or other pointing device, trackball, touchpad, touchscreen, keypad, microphone, voice recognition device, or any other appropriate mechanism for the user to input data to the electronic device 202. Although only one input device 220 is shown, in another embodiment any number and type of input devices may be present.

The output device 221 is that part of the electronic device 202 that presents output to the user. The output device 221 may be a cathode-ray tube (CRT) based video display well known in the art of computer hardware. But, in other embodiments the output device 221 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 221 is shown, in other embodiments, any number of output devices of different types or of the same type may be present.

The bus 225 may represent one or more busses, e.g., PCI, ISA (Industry Standard Architecture), X-Bus, EISA (Extended Industry Standard Architecture), or any other appropriate bus and/or bridge (also called a bus controller).

The electronic device 202 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 202. The hardware and software depicted in FIG. 2 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 205 may be any suitable network or combination of networks and may support any appropriate protocol suitable for communication of data and/or code to/from the electronic device 202. In various embodiments, the network 205 may represent a storage device or a combination of storage devices, either connected directly or indirectly to the electronic device 202. In an embodiment, the network 205 may support Infiniband. In another embodiment, the network 205 may support wireless communications. In another embodiment, the network 205 may support hard-wired communications, such as a telephone line or cable. In another embodiment, the network 205 may support the Ethernet IEEE (Institute of Electrical and Electronics Engineers) 802.3x specification. In another embodiment, the network 205 may be the Internet and may support IP (Internet Protocol). In another embodiment, the network 205 may be a local area network (LAN) or a wide area network (WAN). In another embodiment, the network 205 may be a hotspot service provider network. In another embodiment, the network 205 may be an intranet. In another embodiment, the network 205 may be a GPRS (General Packet Radio Service) network. In another embodiment, the network 205 may be any appropriate cellular data network or cell-based radio network technology. In another embodiment, the network 205 may be an IEEE 802.11B wireless network. In still another embodiment, the network 205 may be any suitable network or combination of networks. Although one network 205 is shown, in other embodiments any number of networks (of the same or different types) may be present.

As will be described in detail below, aspects of an embodiment of the invention pertain to specific apparatus and method elements implementable on an electronic device. In another embodiment, the invention may be implemented as a program product for use with an electronic device. The programs defining the functions of this embodiment may be delivered to the electronic device via a variety of signal-bearing media, which include, but are not limited to:

(1) information permanently stored on a non-rewriteable storage medium, e.g., a read-only memory device attached to or within an adapter or electronic device, such as a CD-ROM readable by a CD-ROM drive;

(2) alterable information stored on a rewriteable storage medium, e.g., a hard disk drive or diskette; or (3) information conveyed to an adapter or electronic device by a communications medium, such as through a computer or a telephone network, e.g., the network 205, including wireless communications.

Such signal-bearing media, when carrying machine-readable instructions that direct the functions of the present invention, represent embodiments of the present invention.

Figure 3:
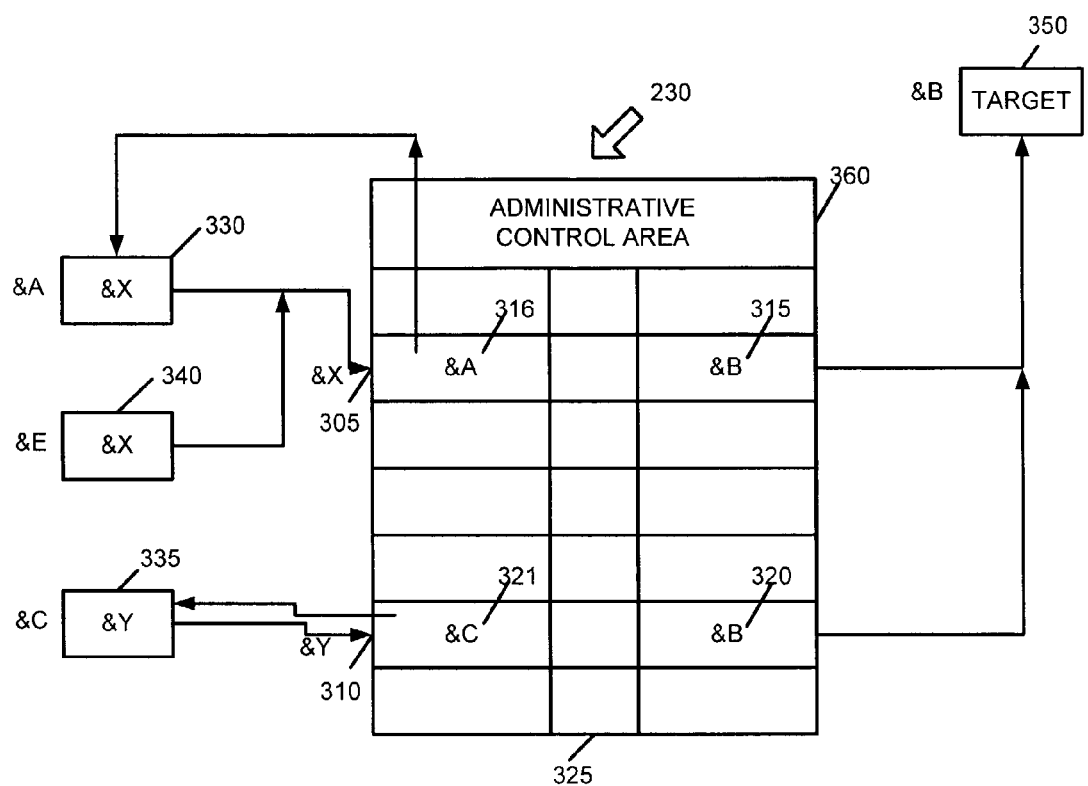
FIG. 3 depicts a block diagram of an example data structure, according to an embodiment of the invention.

FIG. 3 depicts a block diagram of the use of an example pointer-map data structure 230, according to an embodiment of the invention. The pointer-map 230 is stored in a reserved area of a protected area, which prohibits any code other than the code operating in privileged mode from constructing a valid pointer. The pointer map 230 features a double-dereferencing mechanism that offers protection from duping attacks because it is accessible by the pointer controller 232 and is not accessible to non-privileged code. When a pointer is created, a system call is made to set up a pointer-map entry for the pointer being created. The pointer-map entry serves as a protection agent that allows the system to isolate the actual pointer and its target object, thus preventing modified pointers from directly accessing unauthorized storage. This protection is achieved through the combination of several validation mechanisms that occur during pointer dereferencing, as further described below.

In an embodiment, a pointer is constructed as a group of bytes that contains an address. An example of a pointer is the pointer 330 located at address &A. The target of the pointer 330 is the target 350 at address &B, but the pointer 330 does not point directly at the target 350. That is, the storage location at address &A does not contain &B (the address of the target 350). Instead, the storage location for the pointer 330 at address &A points at an entry 305 in the pointer map 230 at address &X, which was established for the pointer 330 when the pointer 330 was created. The entry 305 contains the actual address of the target object at address &B in a target-address field 315. Thus, the contents of the entry 305 in the pointer map data structure 230 are used to actually access the target object 350.

As a mechanism to further ensure the validity of pointers, the entries in the pointer map 230 also include the address of the pointer to which they are associated, e.g., the entry 305 also includes a back-pointer field 316, which points back at its associated pointer 330. The back-pointer prevents code from altering a pointer to point elsewhere in the pointer map 230 and accessing an object that the code should be restricted from accessing.

To prevent destructive code from devising a double-dereferencing pointer map of its own, and thus duping the system into using an incorrect pointer map, in an embodiment the pointer map 230 is contained with a range of reserved addresses that only privileged system code, such as the pointer controller 232, can alter. Thus, the dereferencing mechanism of the pointer controller 232 not only checks to ensure that the back-pointer matches the address of the pointer being dereferenced, the pointer controller 232 also checks to ensure that the pointer points to a legitimate pointer map entry in the reserved address area range 228, as further described below with reference to FIG. 6.

Figure 1:
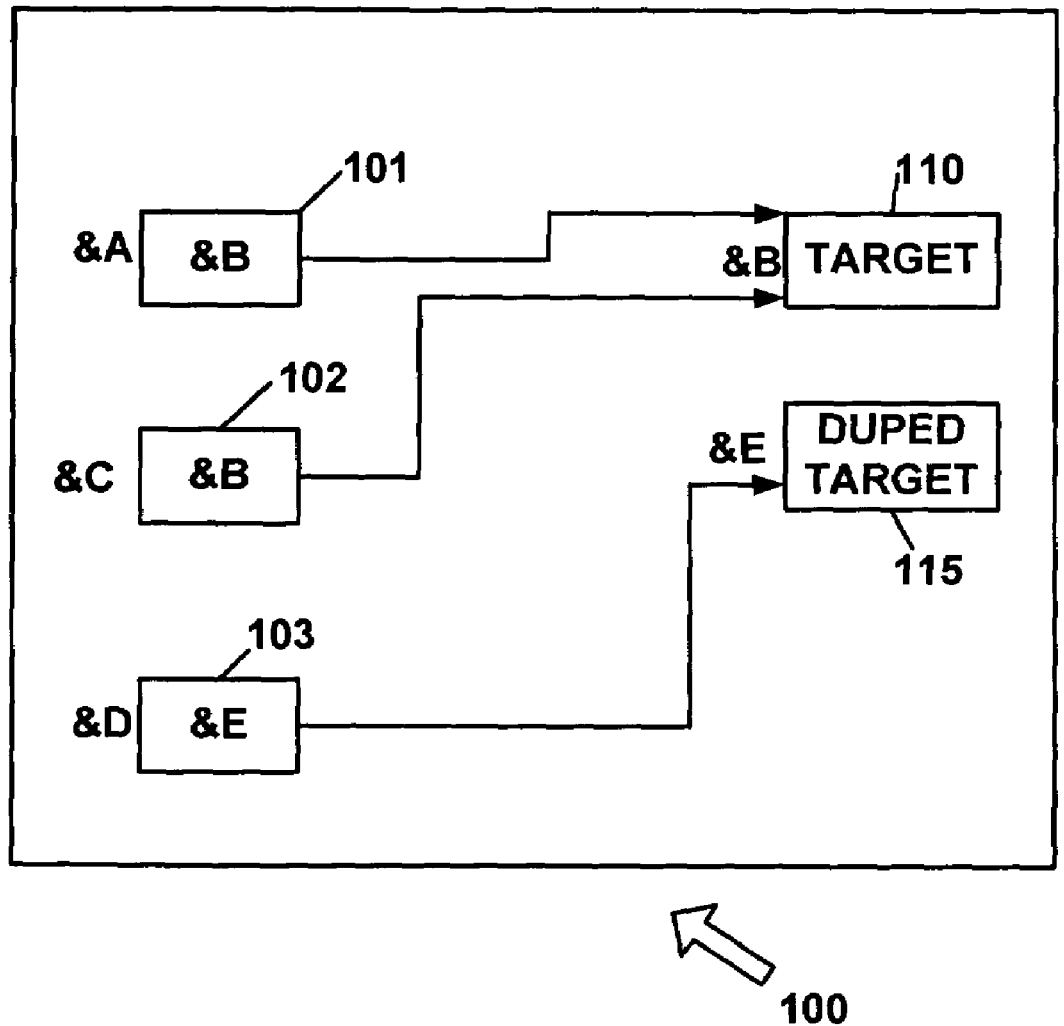
FIG. 1 depicts a block diagram of typical pointers.

The combination of the double-dereferencing mechanism and the reserved address area range 228 of the pointer map 230, plus the back-pointer mechanism all work together to defeat illegitimate pointer creation and use. Thus, a copied pointer is not identical to the original pointer (in contrast, the copied pointer 102 was identical to the original pointer 101 in FIG. 1).

The process of making a legitimate copy of a pointer is much the same as creating an original pointer. The pointer 335 at address &C represents a legitimate copy of the pointer 330. Since each pointer has its own entry in the pointer map 230 to prevent counterfeiting and ensure pointer validity, the pointer 335 contains &Y, which points to the entry 310, which is separate from the entry 305 for the pointer 330. The entry 310 has a back-pointer field 321 that points back at the pointer 335 and a target-address field 320, which points at the same target 350 as did the pointer 330. Thus, the back-pointer field 321 contains &C, which is the address of the pointer 335, and the target-address field 320 contains &B, which is the address of the target 350.

Pointer 340 at address &E, which contains address &X that points at entry 305, is an illegitimate pointer. In contrast to a legitimately copied pointer, attempts to construct and use an illegitimate pointer 340 are foiled by an embodiment of the invention because the pointer map entry 305 only points back to the original pointer 330 at address &A and not at the illegitimate pointer 340 at address &E, thus causing the dereferencing of the pointer 340 to fail the back-pointer check. The back-pointer check is further described below with reference to FIG. 6.

The pointer map 230 may also include control information 325 within each entry. The pointer controller 232 uses the control information 325 to further restrict the use of a pointer based on the permissions or attributes of the task that is executing the code 240. Thus, the pointer controller 232 uses the control information 325 to decide which attributes are required for pointer usage, such as context, process, local/global scope, and profile, although in other embodiments any appropriate attributes may be used. In another embodiment the pointer controller 232 uses the control information 325 for storage protection and security means, for example, to verify that access to storage is not exceeding the size of the storage accessible by the pointer. Although FIG. 3 shows control information 325, in another embodiment, the control information 325 is optional, not used, or not present.

In addition to the pointer map entries previously described above, the pointer map 230 also contains an administrate control area 360, which the pointer controller 232 uses to manage the creation, recycling, and reuse of pointer map entries such that the pointer map 230 is efficiently utilized. In an embodiment, the pointer controller 232 uses a garbage collection technique to recycle entries in the pointer map 230.

Although the various addresses (the pointer address, the back-pointer address, and the target address) were described above as if they were absolute addresses, a relative addressing scheme or any other appropriate addressing technique may be used in various other embodiments.

Figure 4:
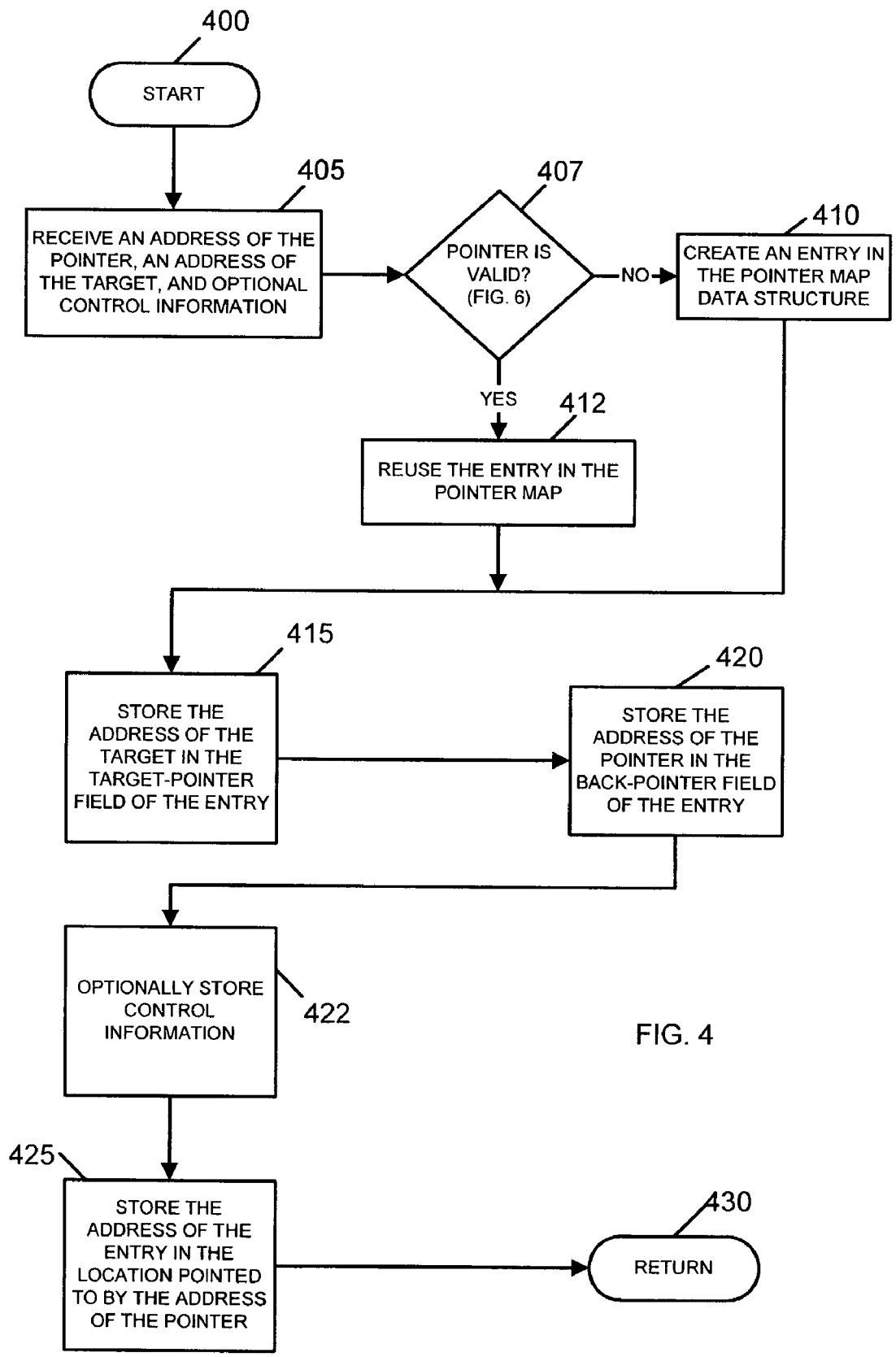
FIG. 4 depicts a flowchart of example processing for creating a pointer, according to an embodiment of the invention.

FIG. 4 depicts a flowchart of example processing for creating a pointer, according to an embodiment of the invention. Control begins at block 400. Control then continues to block 405 where the pointer controller 232 receives an address of a pointer to be created, an address of a target to be pointed to by the pointer from the code 240, and optional control information. Examples of pointers were previously described above with reference to FIG. 3 as pointers 330, 335, and 340 having respective addresses &A, &C, and &E. An example of a target was previously describe above with reference to FIG. 3 as target 350 having an address of &B.

Referring again to FIG. 4, control then continues to block 407 where the pointer controller 232 determines whether the pointer already has a valid associated entry in the pointer map 230, as further described below with reference to FIG. 6.

If the determination at block 407 is false, then control continues to block 410 where the pointer controller 232 creates an entry associated with the address of the pointer received at block 405 in the pointer map data structure 230 using information from the administrative control area 360. Examples of the entry were previously described above with reference to FIG. 3 as entries 305 and 310.

Control then continues to block 415 where the pointer controller 232 stores the address of the target in the target-address field in the created entry in the pointer map 230. Examples of the target-address fields were previously described above with reference to FIG. 3 as fields 315 and 320.

Control then continues to block 420 where the pointer controller 232 stores the address of the pointer in the back-pointer field of the entry of the pointer map 230. Examples of the back-pointer fields were previously described above with reference to FIG. 3 as fields 316 and 321.

Control then continues to block 422 where the pointer controller 232 optionally stores control information in the control information field 325. The control information 325 may include requirements that a subsequent access of the pointer will need to meet in order to use the pointer. For example, the control information 325 may include process, context, profile, and/or local/global scope information, which will be subsequently checked when the pointer is accessed. In other embodiments, any appropriate attribute information may be used.

Control then continues to block 425 where the pointer controller 232 stores the address of the entry in the location pointed to by the address of the pointer. Using the examples of FIG. 3, the pointer controller 232 stores &X at address &A or stores &Y at address &C. Thus, the pointer points at the entry in the pointer map 230 and does not point directly at the target, but instead uses the entry in the pointer map 230 to access the target indirectly.

Control then continues to block 430 where the function returns.

If the determination at block 407 is true, then the pointer already has a valid entry in the pointer map 230, so control continues to block 412 where the pointer controller 232 reuses the valid entry in the pointer map 230. Control then continues to block 415 as previously described above.

Figure 5:
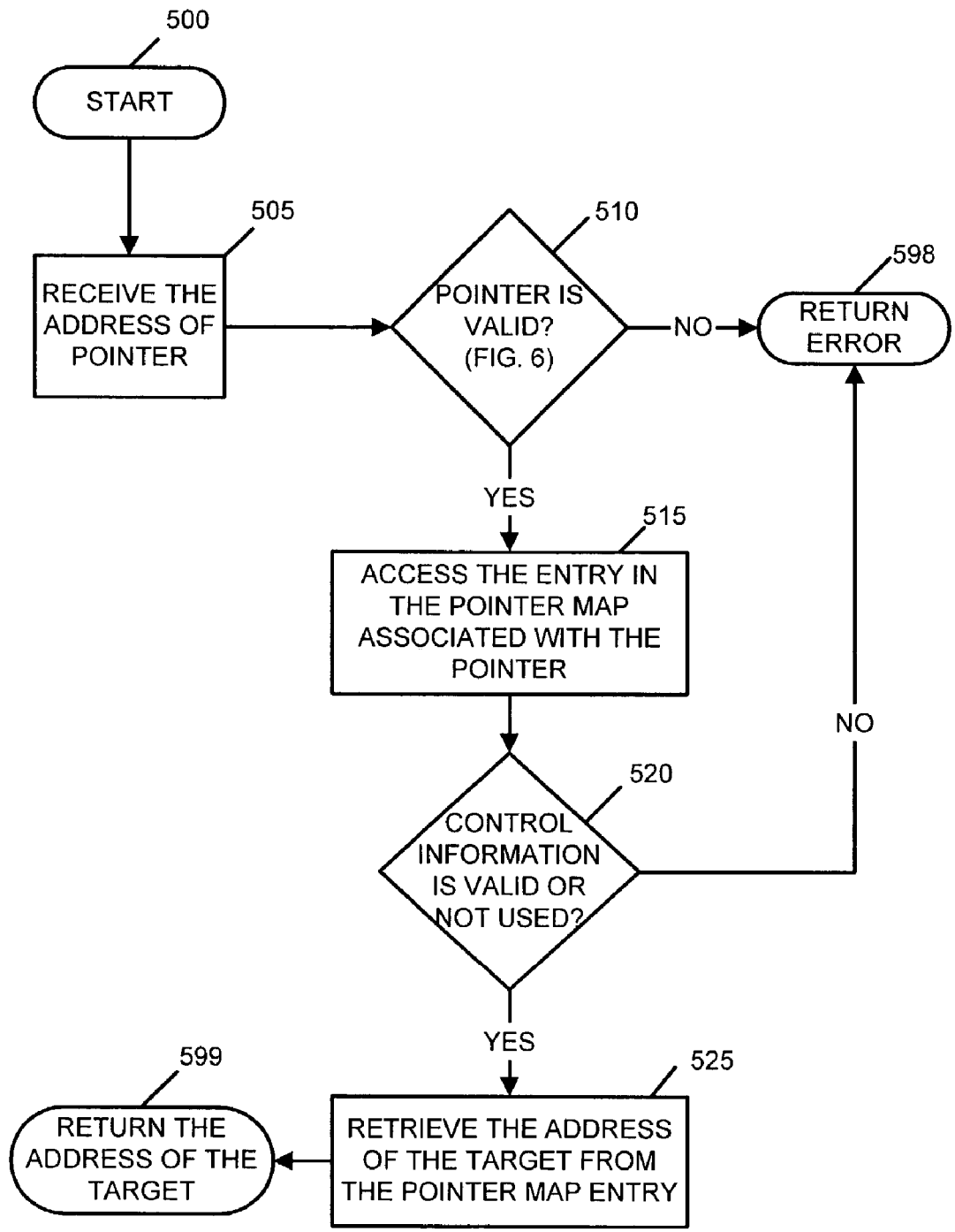
FIG. 5 depicts a flowchart of example processing for accessing a pointer, according to an embodiment of the invention.

FIG. 5 depicts a flowchart of example processing for accessing a pointer, according to an embodiment of the invention. Control begins at block 500.

Control then continues to block 505 where the pointer controller 232 receives the address of the pointer from the code 240. Control then continues to block 510 where the pointer controller 232 determines whether the pointer is valid, as further described below with reference to FIG. 6. If the determination at block 510 is false, then control continues to block 598 where the pointer controller 232 returns an error to the invoking code 240.

If the determination at block 510 is true, then control continues to block 515 where the pointer controller 232 accesses the entry in the pointer map 230 associated with the pointer. Control then continues to block 520 where the pointer controller 232 determines whether the attributes in the control information 325 are satisfied or not used. For example, if the attributes indicate that only a specified process may access the pointer, the pointer controller 232 determines whether the invoking code 240 is part of that specified process. In other embodiments, the pointer controller 232 determines whether any of the attributes previously described above with reference to FIG. 3 are met.

If the determination at block 520 is false (the attributes in the control information 325 when present are not satisfied), then control continues to block 598 where the pointer controller 232 returns an error to the invoking code 240.

If the determination at block 520 is true (the attributes in the control information 325 are satisfied or the control information 325 is not present or otherwise not used), then control continues to block 525 where the pointer controller 232 retrieves the address of the target from the target-address field in the entry in the pointer map 230. Examples of the target-address field are shown as reference numerals 315 and 320 in FIG. 3.

Control then continues to block 599 where the pointer controller 232 returns the address of the target to the invoking code 240.

Figure 6:
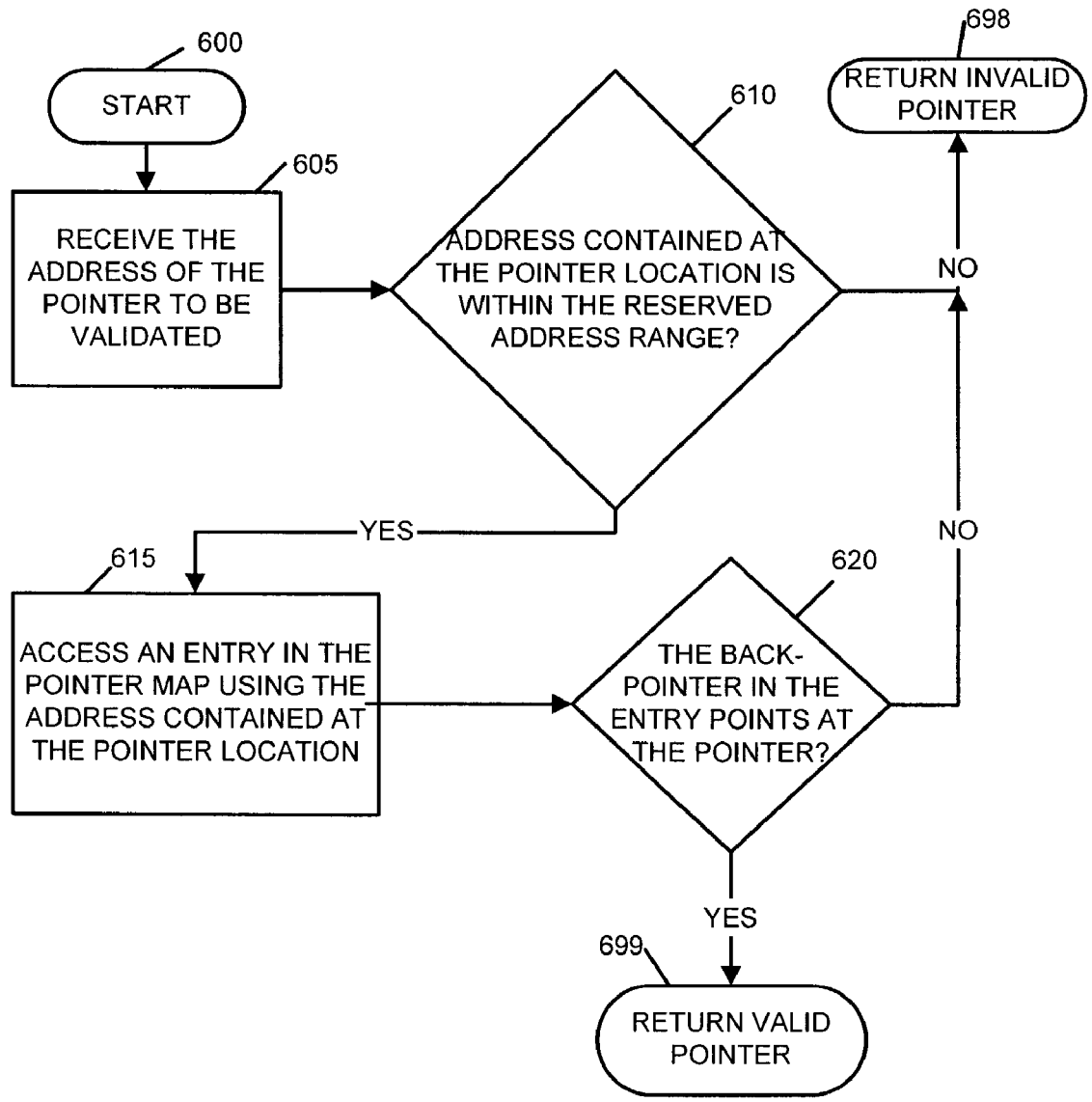
FIG. 6 depicts a flowchart of example processing for determining the validity of a pointer, according to an embodiment of the invention.

FIG. 6 depicts a flowchart of example processing for determining the validity of a pointer, according to an embodiment of the invention. Control begins at block 600.

Control then continues to block 605 where the pointer controller 232 receives the address of the pointer to be validated. Control then continues to block 610 where the pointer controller 232 accesses the contents at the storage location indicated in the address received at block 605 and determines whether the accessed content is an address within an entry of the pointer map 230 within the address range of the reserved area 228, that is whether the address contained at the pointer location is within an entry of the pointer map 230 within the address range of the reserved area 228. Using an example from FIG. 3, if the pointer controller 232 receives &A as the address of the pointer to be validated, the pointer controller 232 determines whether &X is an address of the entry 305 within the reserved address range. If the determination at block 610 is false, then control continues to block 698 where the pointer controller 232 returns an indication that the pointer is invalid.

If the determination at block 610 is true, then control continues to block 615 where the pointer controller 232 accesses an entry in the pointer map 230 using the address contained at the pointer location.

Control then continues to block 620 where the pointer controller 232 determines whether the back-pointer in the entry points at the pointer (i.e., whether the contents of the back-pointer field equal the address of the pointer that was previously received at block 605). If the determination at block 620 is false, then control continues to block 698 where the pointer controller 232 returns an indication to the invoker that the pointer is invalid.

If the determination at block 620 is true, then control continues to block 699 where the pointer controller 232 returns an indication to the invoker that the pointer is valid.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   receiving an address of a storage location of a pointer from code that accesses the pointer;
   finding an entry in a pointer map based on the pointer, wherein the entry comprises an address of a storage location of a target of the pointer;
   determining whether the entry further comprises the address of the storage location of the pointer; and
   if the entry comprises the address of the storage location of the pointer, returning the address of the storage location of the target of the pointer to the code that accesses the pointer.

2. The method of claim 1, further comprising:
   verifying that the entry is located within a reserved address range.

3. The method of claim 1, further comprising:
   receiving the address of the storage location of the target; and
   storing the address of the storage location of the target in the entry.

4. The method of claim 1, further comprising:
   receiving an address of the pointer; and
   storing the address of the pointer in a back-pointer field in the entry.

5. The method of claim 1, further comprising:
   storing an address of the entry at a location indicated by the address of the storage location of the pointer.

6. An apparatus comprising:
   means for storing a target-address in an entry of a pointer-map, wherein the target-address comprises a first address of a storage location of a target of a pointer;
   means for storing a painter-address in the entry of the pointer-map, wherein the pointer-address comprises a second address of a storage location of the pointer;
   means for storing a third address of a location of the entry into the storage location of the pointer;
   means for receiving the pointer-address from code that accesses the pointer;
   means for finding the entry in the pointer map based on the pointer-address; and
   means for returning the target-address of the target of the pointer to the code that accesses the pointer if the entry comprises the pointer-address.

7. The apparatus of claim 6, further comprising:
   means for storing control information in the entry of the pointer-map.

8. The apparatus of claim 7, wherein the control information is selected from a group consisting of: a context, a process, a local/global scope, and a profile.

9. The apparatus of claim 7, farther comprising:
   means for verifying that a process associated with the pointer-address has attributes that satisfy the control information.

10. The apparatus of claim 6, further comprising:
    means for determining whether the pointer is valid based on the pointer-address.

11. A signal-bearing medium encoded with instructions, wherein the instructions when executed by a processor comprise:
    receiving a pointer-address, wherein the pointer-address comprises an address of a storage location of a pointer, and a target-address;
    determining whether a pointer has a valid entry in a pointer map based on the pointer-address; wherein the determining further comprises determining whether the pointer-address exists in the pointer map;
    when the valid entry does not exist, creating a new entry in the pointer map for the pointer; and storing the target-address in the new entry;
    receiving the pointer-address from code that accesses the pointer;
    finding the new entry in the pointer map based on the pointer address; and
    returning the target-address of a target of the pointer to the code that accesses the pointer if the new entry comprises the pointer-address.

12. The signal-bearing medium of claim 11, wherein the instructions further comprise:
    staring the pointer-address in the new entry.

13. The signal-bearing medium of claim 11, wherein the instructions further comprise:
    storing control information in the new entry.

14. The signal-bearing medium of claim 13, wherein the control information is selected from a group consisting of: context, process, local/global scope, and profile.

15. The signal-bearing medium of claim 11, wherein the determining further comprises:
    verifying whether content at the pointer-address comprises an address within a reserved range.

16. A signal-bearing medium encoded with a data structure accessed by a controller that is to be executed by a processor, wherein the data structure comprises at least one entry, wherein the entry comprises:
    a back-pointer, wherein the controller is to set an address of a storage location of a pointer in the back-pointer; and
    a target-address, wherein the controller is to set an address of a target of the pointer in the target-address, is to store an address of the entry in the storage location of the pointer, is to receive the address of the storage location of the pointer, and is to determine whether the pointer is valid based on whether content of the back-pointer equals the address of the storage location of the pointer, and is to find the target-address of the target based on the entry, and return the target-address of the target of the pointer to code that accesses the pointer if the pointer is valid.

17. The signal-bearing medium of claim 16, where the at least one entry further comprises:
    control information, wherein the pointer controller is further to set the control information.

18. An electronic device comprising:
    a processor; and
    a storage device encoded with instructions, wherein the instructions when executed on the processor comprise:

receiving a pointer-address, wherein the pointer-address comprises an address of a storage location of a pointer and a target-address, determining whether the pointer has an entry that is valid in a pointer map based on the pointer-address, wherein the determining further comprises determining whether a back-pointer in the entry comprises the pointer-address, when the pointer has the entry that is valid, storing the target-address in the valid entry, receiving the pointer-address from code that accesses the pointer, finding the entry in the pointer map based on the painter-address, and returning the target-address of a target of the pointer to the code that accesses the pointer if the entry comprises the pointer-address.

19. The electronic device of claim 18, wherein the instructions further comprise:

storing the pointer-address in the valid entry.

20. The electronic device of claim 18, wherein the determining further comprises:

verifying whether content at the pointer-address comprises an address of the entry within a reserved range.

* * * * *